United States Patent
Lee et al.

(10) Patent No.: US 7,982,727 B2
(45) Date of Patent: Jul. 19, 2011

(54) DISPLAY APPARATUS

(75) Inventors: Dong-Hwan Lee, Yongin-si (KR); Dong-Ho Lee, Yongin-si (KR); Soo-Jin Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 411 days.

(21) Appl. No.: 11/102,175

(22) Filed: Apr. 8, 2005

(65) Prior Publication Data

US 2006/0176254 A1 Aug. 10, 2006

(30) Foreign Application Priority Data

Feb. 7, 2005 (KR) .................. 10-2005-0011298

(51) Int. Cl.
*G09G 5/00* (2006.01)
(52) U.S. Cl. .......................................... 345/204; 345/87
(58) Field of Classification Search .......... 345/204–206, 345/1.1–1.3
See application file for complete search history.

(56) References Cited

U.S. PATENT DOCUMENTS

| | | | | |
|---|---|---|---|---|
| 5,945,734 A | * | 8/1999 | McKay | 257/687 |
| 6,281,891 B1 | * | 8/2001 | DaCosta et al. | 345/206 |
| 6,706,546 B2 | * | 3/2004 | Inao et al. | 438/31 |
| 6,953,709 B2 | * | 10/2005 | Hayashida | 438/118 |
| 6,995,082 B2 | * | 2/2006 | Lee | 438/612 |
| 7,079,174 B2 | * | 7/2006 | Taniguchi et al. | 348/51 |
| 2001/0015773 A1 | * | 8/2001 | Eldridge et al. | 348/765 |
| 2004/0207569 A1 | * | 10/2004 | Ho et al. | 345/1.1 |
| 2005/0001952 A1 | * | 1/2005 | Han et al. | 349/65 |
| 2005/0040539 A1 | * | 2/2005 | Carlsgaard | 257/778 |
| 2006/0234767 A1 | * | 10/2006 | Nishikawa et al. | 455/556.1 |

FOREIGN PATENT DOCUMENTS

| | | | |
|---|---|---|---|
| JP | 10-107072 | | 4/1998 |
| JP | 2000-021939 | | 1/2000 |
| JP | 2000-183093 | | 6/2000 |
| JP | 2001-068832 | | 3/2001 |
| JP | 2001-127216 | | 5/2001 |
| JP | 2002-006333 | | 1/2002 |
| JP | 2002006333 A | * | 1/2002 |
| JP | 2002-246404 | | 8/2002 |
| JP | 2002-277891 | | 9/2002 |
| JP | 2003-323129 | | 11/2003 |

* cited by examiner

*Primary Examiner* — Kevin M Nguyen
*Assistant Examiner* — Kenneth B Lee, Jr.
(74) *Attorney, Agent, or Firm* — Innovation Counsel LLP

(57) ABSTRACT

In a display apparatus, a printed circuit board has a base substrate, a flip chip, and an adhesive member. The flip chip is mounted onto a first face of the base substrate by the adhesive member between the flip chip and the first face of the base substrate. The first display panel is disposed on a second face opposite to the first face of the base substrate, and a second display panel is mounted on the first face of the base substrate with the flip chip. Thus, a chip mounted on the printed circuit board is made smaller and the freed up space can be used to mount the second display panel.

8 Claims, 10 Drawing Sheets

100

DISPLAY APPARATUS

RELATED APPLICATION

This application relies for priority upon Korean Patent Application No. 2005-11298 filed on Feb. 7, 2005, the content of which is incorporated herein by reference in its entirety.

BACKGROUND OF THE INVENTION

1. Field of the Invention

The present invention relates to a display apparatus. More particularly, the present invention relates to a display apparatus capable of enhancing packaging density of a printed circuit board.

2. Description of the Related Art

A liquid crystal display apparatus includes a liquid crystal display panel that displays an image in response to a driving signal and a driving circuit that outputs the driving signal for the liquid crystal display panel.

In general, the driving circuit includes a data driving circuit outputting a data signal and a gate driving circuit outputting a gate signal. Responsive to various control signals, the data and gate driving circuits apply the data and gate signals to the liquid crystal display panel at appropriate times.

The liquid crystal display apparatus further includes a printed circuit board with circuits for applying the various control signals to the data and gate driving circuits. Among the circuits on the printed circuit board, a control chip that applies the control signals to the data and gate driving circuits has a largest size.

In the conventional liquid crystal display apparatus, the control chip is mounted on the printed circuit board by a ball grid array method using a solder ball. When mounting the control chip on the printed circuit board by the ball grid array method, the control chip requires more space because a certain amount of space is needed for the soldering of the control chip. As a result of more space being needed for the control chip, less space is available for mounting the circuits.

Furthermore, in case of a dual-panel type liquid crystal display apparatus or a liquid crystal display apparatus to which a camera is adopted, the control chip incorporates various added functions to operate those apparatuses. Thus, the printed circuit board requires a relatively large space to accommodate the control chip.

BRIEF SUMMARY OF THE INVENTION

The present invention provides a display apparatus capable of enhancing packaging density of a printed circuit board.

In one aspect of the present invention, a display apparatus includes a printed circuit board, a driving circuit and a display panel. The printed circuit board has a base substrate, a flip chip and an adhesive member to output a control signal. The flip chip is fixed onto the base substrate by the adhesive member between the base substrate and the flip chip.

The driving circuit outputs a driving signal in response to the control signal and the display panel displays an image in response to the driving signal.

In another aspect of the present invention, a display apparatus includes a printed circuit board, a driving circuit, a first display panel and a second display panel. The printed circuit board has a base substrate, a flip chip and an adhesive member to output a control signal. The flip chip is fixed onto a first face of the base substrate by the adhesive member between the base substrate and the flip chip.

The driving circuit outputs a first driving signal or a second driving signal in response to the control signal. The first display panel is disposed on a second face opposite to the first face of the base substrate and displays an image in response to the first driving signal. The second display panel is disposed on the first face of the base substrate and displays an image in response to the second driving signal.

In still another aspect of the present invention, a display apparatus includes a printed circuit board, a driving circuit, a first display panel, a second display panel and a camera part.

The printed circuit board has a base substrate, a flip chip and an adhesive member to output a first control signal and a second control signal. The flip chip is fixed onto a first face of the base substrate by the adhesive member between the base substrate and the flip chip.

The driving circuit outputs a first driving signal or a second driving signal in response to the first control signal. The first display panel is disposed on a second face opposite to the first face of the base substrate and displays an image in response to the first driving signal. The second display panel is disposed on the first face of the base substrate and displays an image in response to the second driving signal. The camera part is disposed on the second face and operated in response to the second control signal.

According to the display apparatus, the flip chip is mounted onto the first face of the base substrate with the second display panel by the adhesive member between the flip chip and the first face of the base substrate, so that the size of the flip chip may decrease and the printed circuit board may obtain a space by the decreased size of the flip chip.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

Hereinafter, the present invention will be explained in detail with reference to the accompanying drawings.

Figure 1:
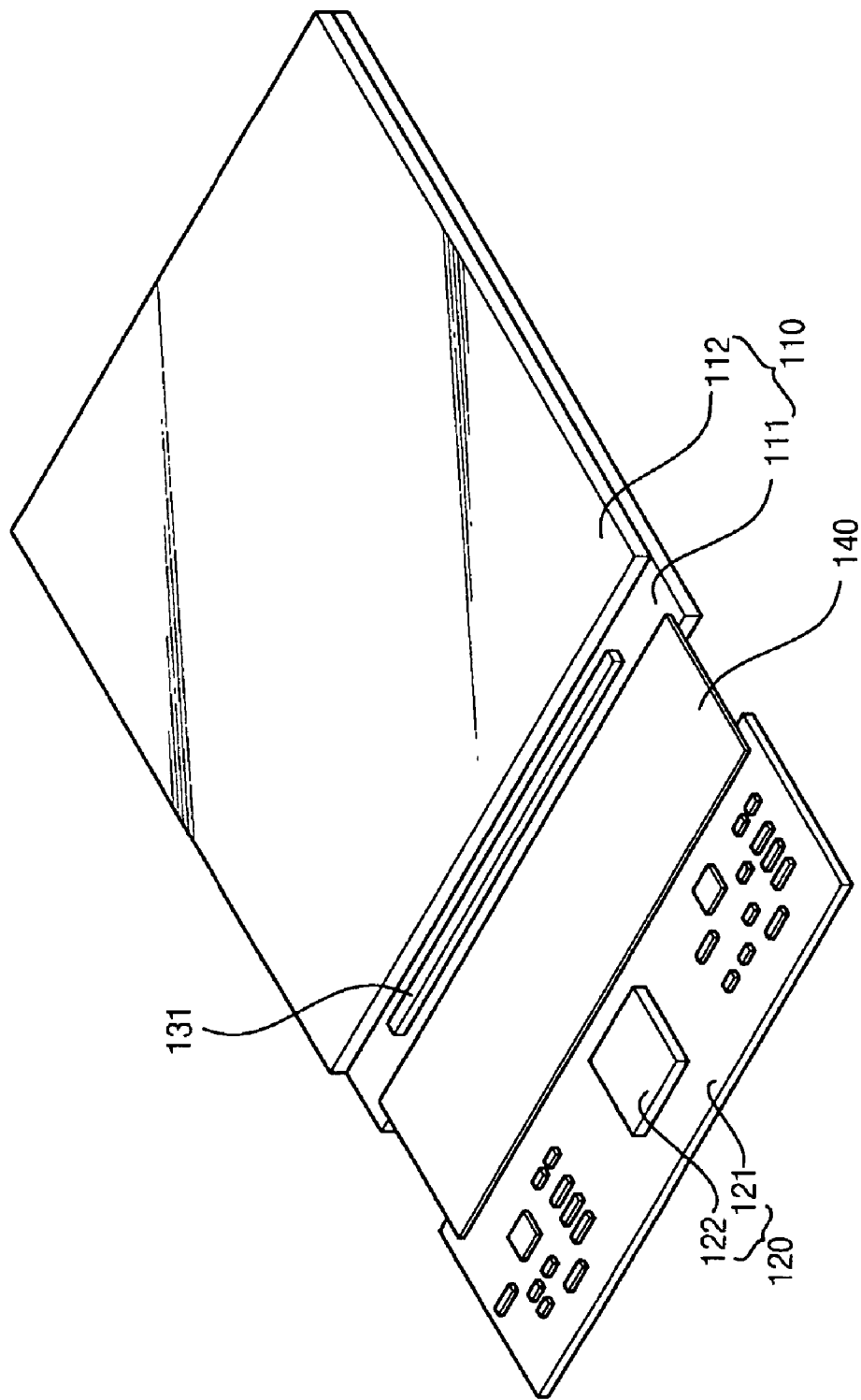
FIG. 1 is a perspective view showing a liquid crystal display apparatus according to an exemplary embodiment of the present invention.
Figure 2:
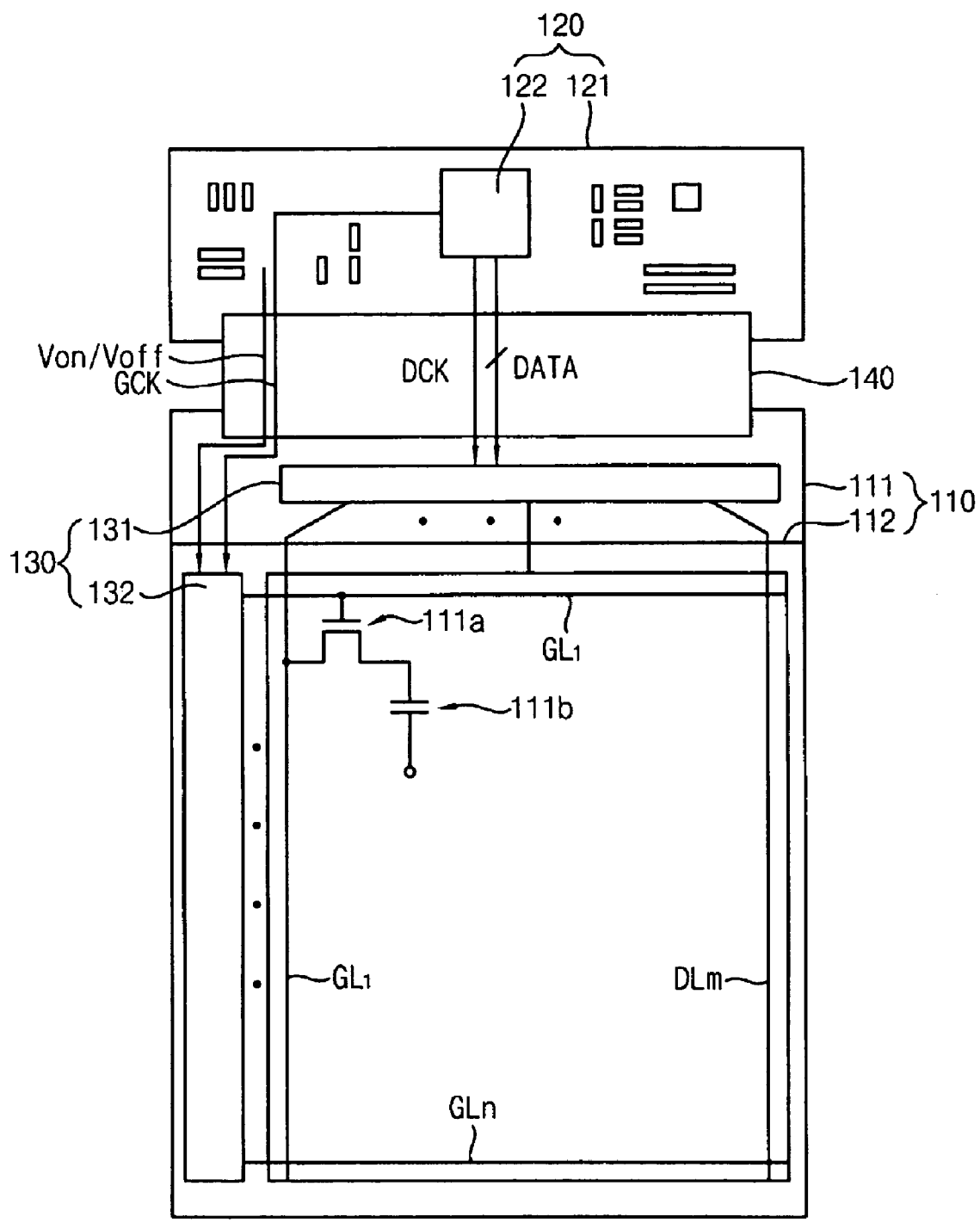
FIG. 2 is a plan view of the liquid crystal display apparatus shown in FIG. 1.

FIG. 1 is a perspective view showing a liquid crystal display apparatus according to an exemplary embodiment of the present invention. FIG. 2 is a plan view of the liquid crystal display apparatus shown in FIG. 1.

Referring to FIGS. 1 and 2, a liquid crystal display apparatus 100 according to an exemplary embodiment of the present invention includes a liquid crystal display panel 110, a flexible printed circuit film 140, a printed circuit board 120 and a driving circuit 130.

The liquid crystal display panel 110 has a thin film transistor (TFT) substrate 111, a color filter substrate 112 and a liquid crystal layer (not shown). The color filter substrate 112 is coupled to the TFT substrate 111, and the liquid crystal layer is interposed between the TFT substrate 111 and the color filter substrate 112.

As shown in FIG. 2, the TFT substrate 111 includes a plurality of data lines DL1~DLm, a plurality of gate lines GL1~GLn, a plurality of TFTs 111a and a plurality of pixel electrodes. The data lines DL1~DLm are insulated from the gate lines GL1~GLn and substantially perpendicularly intersected with the gate lines GL1~GLn. The TFT substrate 111 is defined by the data lines DL1~DLm and the gate lines GL1~GLn such that the TFT substrate 111 includes a plurality of pixel areas in a matrix configuration. The TFTs 111a are formed in the pixel areas, respectively. Each of the TFTs 111a includes a source electrically connected to a corresponding data line of the data lines DL1~DLm, a gate electrically connected to a corresponding gate line of the gate lines GL1~GLn and a drain electrically connected to a corresponding pixel electrode of the pixel electrodes.

The color filter substrate 112 is a substrate on which red, green and blue color pixels (not shown) are formed by a thin film process, and includes a common electrode (not shown) formed thereover. The common electrode and the pixel electrodes sandwich the liquid crystal layer, forming a liquid crystal capacitor 111b. The liquid crystal capacitor 111b is connected to each drain of the TFTs 111a.

The printed circuit board 120 includes a base substrate 121 that supports numerous circuit elements including a flip chip 122. A structure and a method for mounting the flip chip 122 on the base substrate 121 will be described in detail with reference to FIGS. 3 to 5A below.

The printed circuit board 120 receives various external signals and outputs various control signals in response to the external signals. In the present embodiment, the flip chip 122 is operated as a graphic control chip to output an image signal (DATA), a gate clock signal GCK and a data clock signal DCK needed to drive the liquid crystal display panel 110.

The flexible printed circuit film 140 is disposed between the printed circuit board 120 and the liquid crystal display panel 110. The flexible printed circuit film 140 has a first end attached to the printed circuit board 120 and a second end attached to the liquid crystal display panel 110. Thus, the flexible printed circuit film 140 transmits the control signals to the liquid crystal display panel 110 from the printed circuit board 120.

The data driving circuit 130 includes a data driving circuit 131 to apply a data signal to the liquid crystal display panel 110 and a gate driving circuit 132 to apply a gate signal to the liquid crystal display panel 110.

The data driving circuit 131 is embedded in a chip and mounted on the TFT substrate 111 of the liquid crystal display panel 110, so that the data driving circuit 131 outputs the data signal in response to the image signal (DATA) and the data clock signal DCK applied to the liquid crystal display panel 110 through the flexible printed circuit film 140. The output data signal is applied to the data lines DL1~DLm on the TFT substrate 111.

The gate driving circuit 132 is substantially simultaneously formed with the TFTs 111a on the TFT substrate 111 by the thin film process. The gate driving circuit 132 outputs the gate signal in response to the gate clock signal (GCK) and the on/off voltage Von/Voff applied to the liquid crystal display panel 110 through the flexible printed circuit film 140. The output gate signal is sequentially applied to the gate lines GL1~GLn on the TFT substrate 111.

Figure 3:
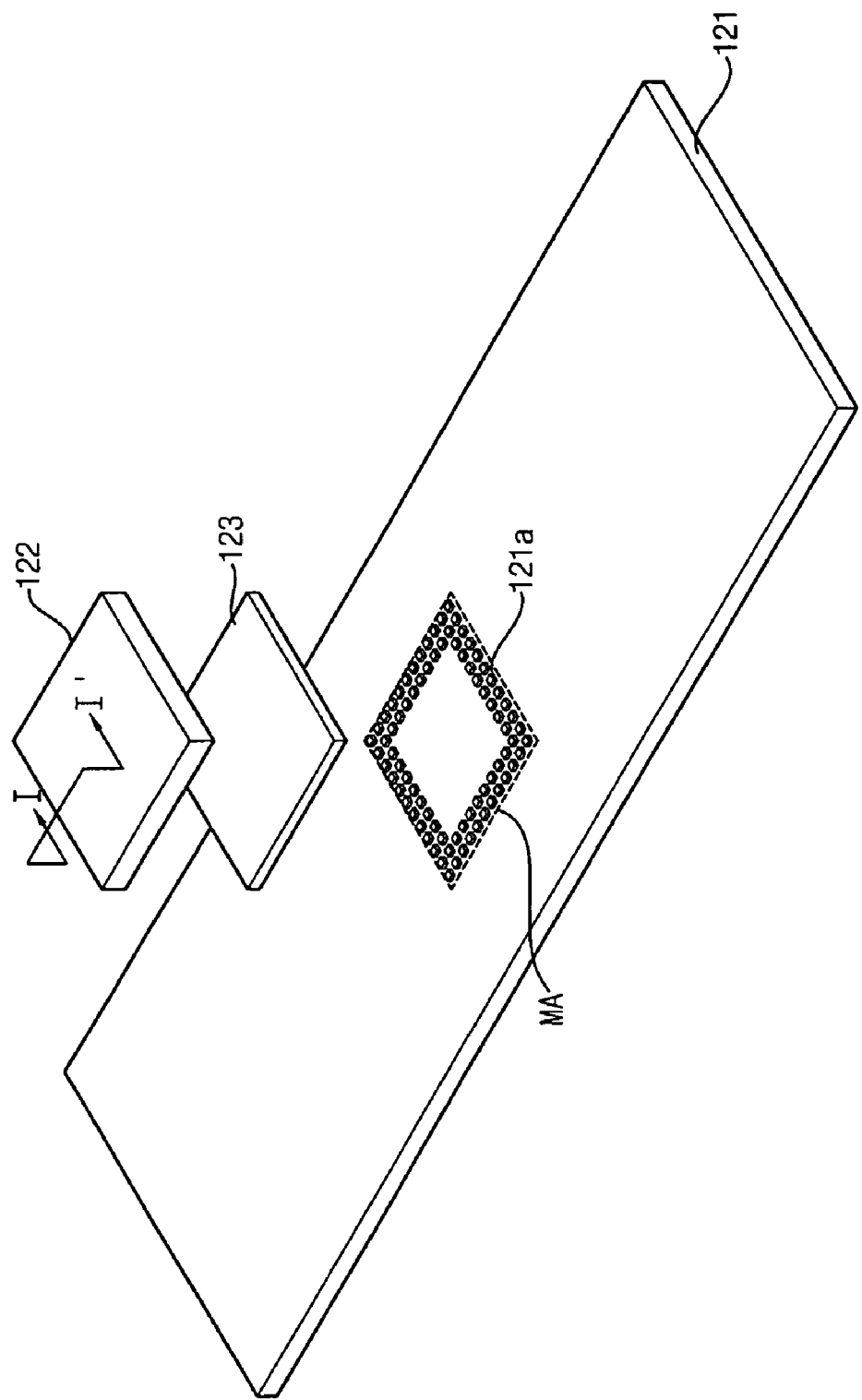
FIG. 3 is a perspective view illustrating a combination of the base substrate and the flip chip shown in FIG. 1.
Figure 4:
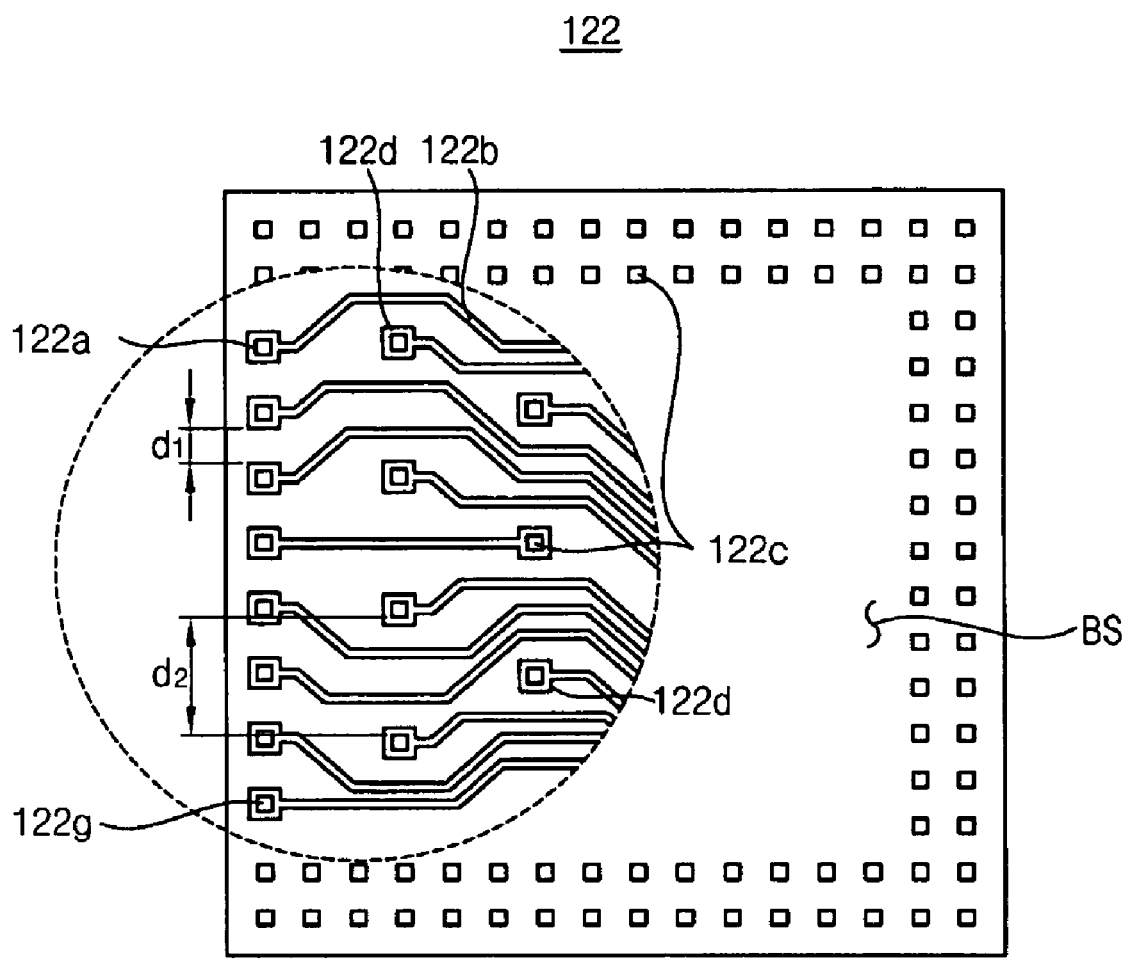
FIG. 4 is a plan view showing a rear face of the flip chip shown in FIG. 1.
Figure 5A:
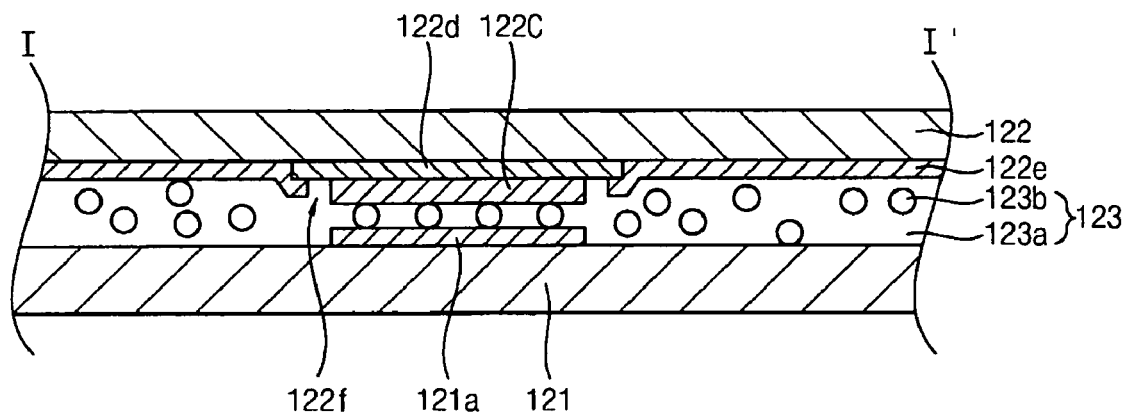
FIG. 5A is a cross-sectional view taken along a line I-I' of FIG. 3.

FIG. 3 is a perspective view illustrating a combination of the base substrate and the flip chip shown in FIG. 1. FIG. 4 is a plan view showing a rear face of the flip chip shown in FIG. 1. FIG. 5A is a cross-sectional view taken along a line I-I' of FIG. 3.

Referring to FIG. 3, the base substrate 121 is provided with a mounting area MA on which the flip chip 122 is mounted. A plurality of input pads 121a configured to receive the control signals from the flip chip 122 is formed in the mounting area MA. In the present embodiment, the mounting area MA has a size corresponding to that of the flip chip 122, and the input pads 121a are arranged in two lines along an end portion of the mounting area MA.

As shown in FIG. 4, the flip chip 122 includes a plurality of output pads 122a, a plurality of connecting lines 122b, a plurality of second output pads 122d and a plurality of bumps 122c. The control signals from the flip chip 122 are output through the first output pads 122a. The first output pads 122a are arranged in a line along an edge of the rear face of the flip chip 122.

The second output pads 122d are arranged in lines that are substantially parallel to the line in which the first output pads 122a are arranged. The particular embodiment of FIG. 4 shows that the second output pads 122d are arranged in two lines. The bumps 122c are disposed on the second output pads 122d so that the bumps 122c protrude from a rear face BS by a predetermined height. Each of the bumps 122c has a size smaller than that of the second output pads 122d on which it is placed. In the present embodiment, the first output pads 122a are spaced apart from each other by a first interval distance d1, and the bumps 122c are spaced apart from each other at a second interval distance d2 greater than the first interval distance d1. The second interval distance d2 may be constant or varied.

The connecting lines 122b are positioned between the first output pads 122a and the second output pads 122d. Thus, the first output pads 122a may be arranged in a single line along the edge of the flip chip 122 and the second output pads 122d may be arranged in parallel lines. Also, the first output pads 122a may be arranged by the first distance d1 and the second output pads 122d may be arranged by the second distance d2. The connecting lines 122b may extend in the region between the neighboring second output pads 122d, and electrically connect one of the first output pads 122a to one of the second output pads 122d.

As shown in FIGS. 3 and 5A, an anisotropic conductive film 123 is formed between the flip chip 122 and the base substrate 121 as an adhesive member. The anisotropic conductive film 123 includes a thermosetting resin 123a and a plurality of conductive particles 123b that are distributed in the thermosetting resin 123a. The conductive particles 123b have a spherical shape.

When a pressure is applied to the flip chip 122 or the base substrate 121 toward each other, the distance between the base substrate 121 and the flip chip 122 is narrowed or closed. Thus, the conductive particles 123b between the base substrate 121 and the flip chip 122 electrically connect the bumps 123c and the input pads 121a.

The thermosetting resin 123a is hardened by heat externally applied thereto to fix the flip chip 122 to the mounting area MA of the base substrate 121.

An insulating layer 122e covering the first output pads 122a, second output pads 122d and connecting lines 122b may be further formed on the rear surface BS of the flip chip 122. Thus, the insulating layer 122e electrically insulates the first output pads 122a, second output pads 122d and the connecting lines 122b from each other. The insulating layer 122e is provided with a plurality of contact holes 122f formed therethrough to expose the bumps 122c on the second output pads 122d. Accordingly, the bumps 122c exposed through the contact holes 122f may be electrically connected with the input pads 121a of the base substrate 121 by the anisotropic conductive film 123.

In the present embodiment, a plurality of test bumps 122g (see FIG. 4) are formed on the first output pads 122a so as to test the flip chip 122. The test bumps 122g have a smaller size than the first output pads 122a on which they are formed.

Figure 5B:
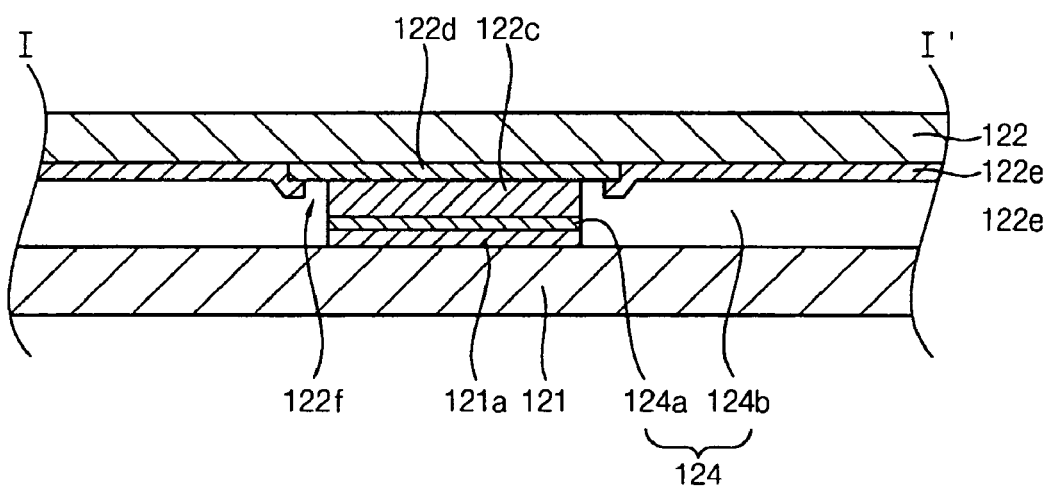
FIG. 5B is a cross-sectional view showing an adhesive according to another exemplary embodiment of the present invention.

FIG. 5B is a cross-sectional view showing an adhesive according to another exemplary embodiment of the present invention.

Referring to FIG. 5B, an adhesive 124 includes a plurality of metal layers 124a and an epoxy resin 124b. The metal layers 124a are formed on the input pads 121a of the base substrate 121 or the bumps 122c of the flip chip 122. In the present embodiment, the metal layers 124a includes tin (Sn).

The epoxy resin 124b is disposed between the base substrate 121 and the flip chip 122 and hardened by means of heat and pressure to fix the flip chip 122 to the base substrate 121.

When the flip chip 122 is fixed to the base substrate 121 by heat and pressure, the metal layers 124a become electrically connected to the bumps 122c formed on the flip chip 122. In the present embodiment, the bumps 122c include gold (Au).

Figure 6:
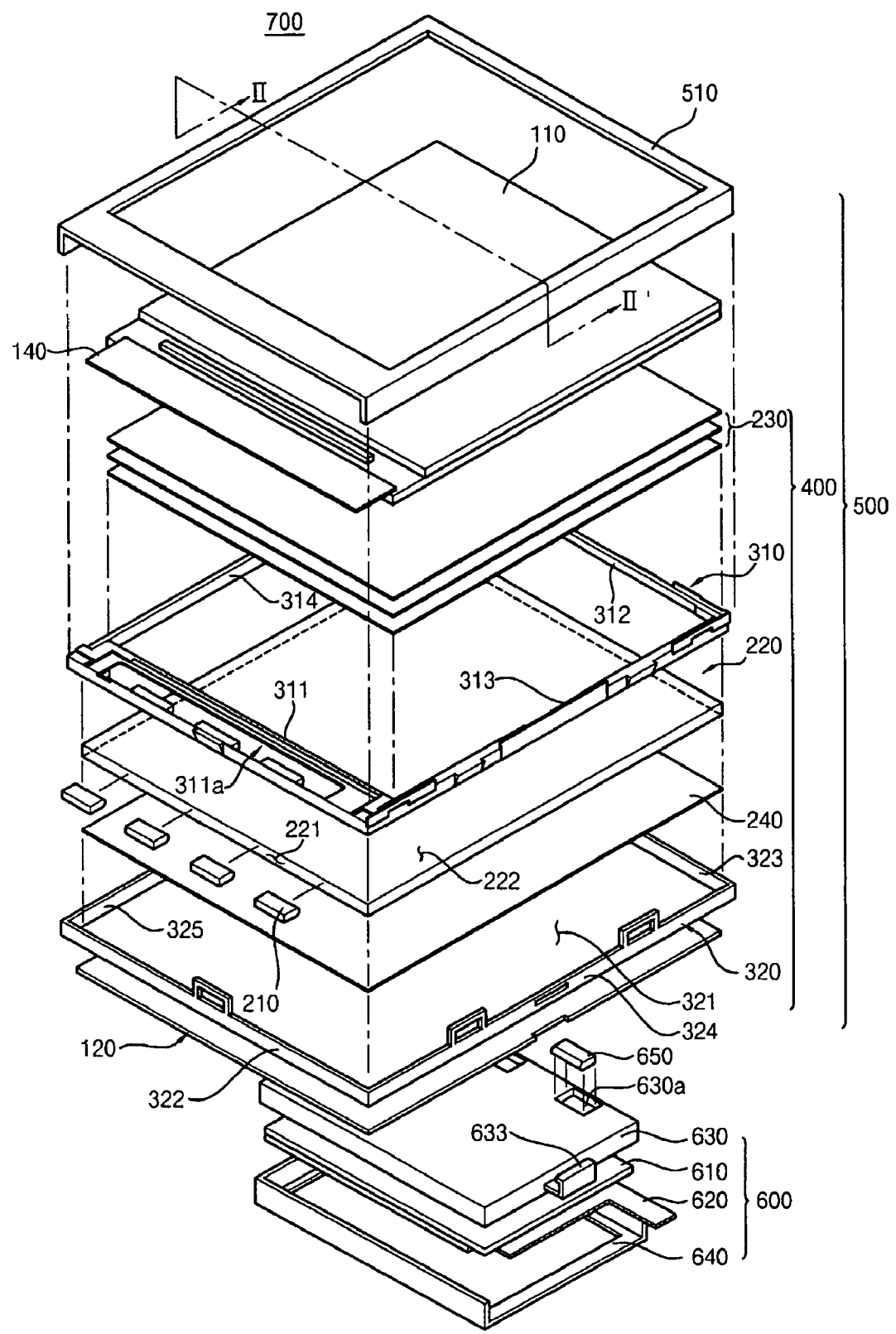
FIG. 6 is an exploded perspective view showing a dual panel type liquid crystal display apparatus according to another exemplary embodiment of the present invention.
Figure 7:
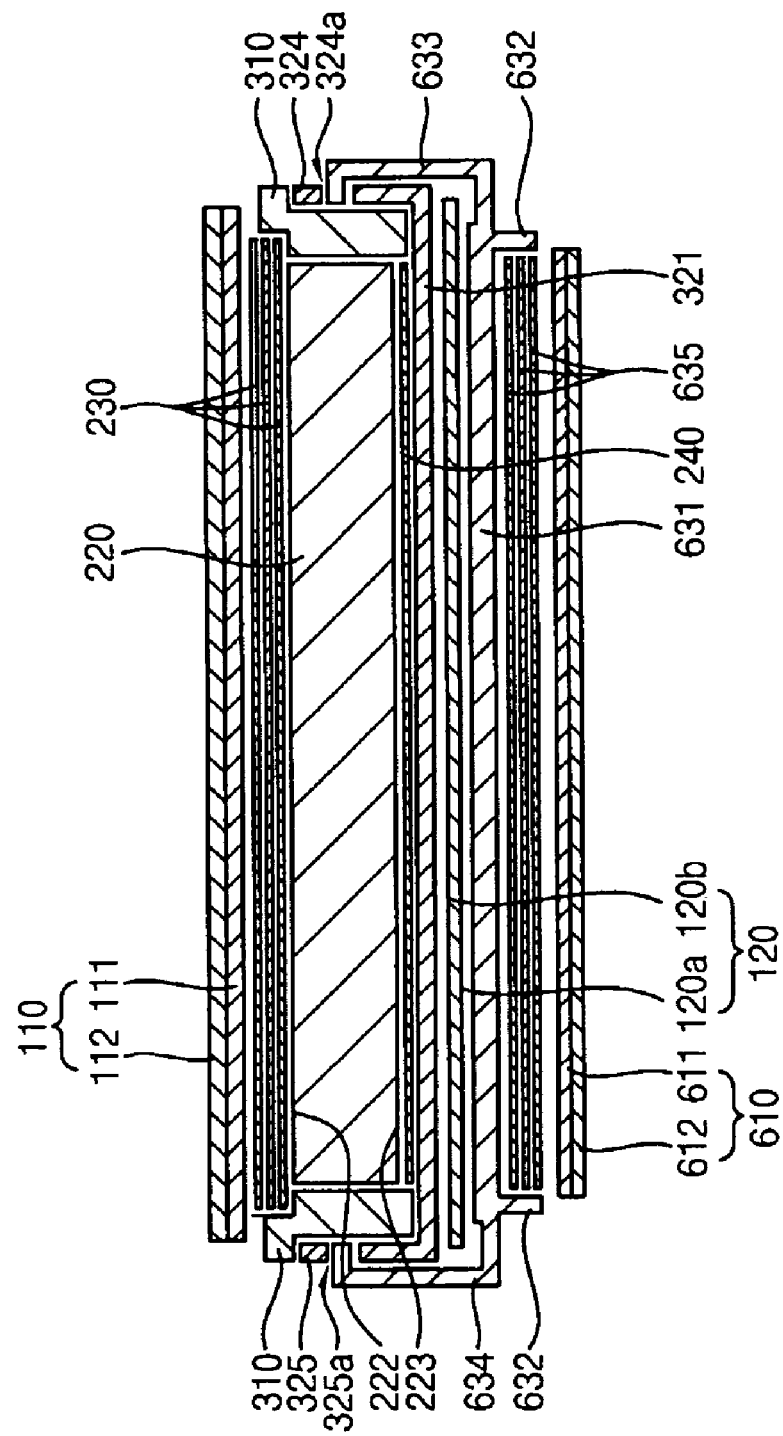
FIG. 7 is a cross-sectional view of the dual panel type liquid crystal display apparatus in FIG. 6.

FIG. 6 is an exploded perspective view showing a dual panel type liquid crystal display apparatus according to another exemplary embodiment of the present invention. FIG. 7 is a cross-sectional view of the dual panel type liquid crystal display apparatus in FIG. 6.

Referring to FIGS. 6 and 7, a dual panel type liquid crystal display apparatus 700 includes a main display module 500 and a sub display module 600. The main display module 500 includes a main liquid crystal display panel 110 and a backlight assembly 400. The backlight assembly 400 generates light. The main liquid crystal display panel 110 disposed on the backlight assembly displays an image using the light from the backlight assembly 400.

The backlight assembly 400 includes a light source 210, a light guide plate 220, a main mold 310 and a bottom chassis 320. The light source 210 includes a point light source such as a light emitting diode LED and emits light. The light guide plate 220 receives the light through a side face 221 and provides the received light to the main liquid crystal display panel 110 through an upper face 222.

A first optical sheet 230 is disposed on the upper face 222 of the light guide plate 220 and a reflecting sheet 240 is disposed under a lower face 223 of the light guide plate 220. The first optical sheet 230 may have a diffusion sheet diffusing the light and at least one prism sheet condensing the light. Thus, the first optical sheet 230 may improve brightness and visual angle of the light provided from the light guide plate 220 through the upper face 222. The reflecting sheet 240 reflects any light that leaked through the lower face 223 of the light guide plate 220 to improve the light efficiency of the backlight assembly 400.

The main mold 310 has a rectangular frame shape having a first sidewall 311, a second sidewall 312, a third sidewall 313 and a fourth sidewall 314. The main mold 310 has a first receiving space 311a formed at the first sidewall 311 to receive the light source 210. The first, second, third and fourth sidewalls 311, 312, 313 and 314 face the side face 221 of the light guide plate to guide a receiving position of the light guide plate 220.

The bottom chassis 320 includes a base 321 and fifth, sixth, seventh and eighth sidewalls 322, 323, 324 and 325 extending from the base 321 such that the bottom chassis 320 can be assembled with the main mold 310. The fifth, sixth, seventh and eighth sidewalls 322, 323, 324 and 325 face the first, second, third and fourth sidewalls 311, 312, 313 and 314 of the main mold 310, respectively. The main mold 310 may be combined with the bottom chassis 320 by inserting the protrusions on the first, second, third and fourth sidewalls 311, 312, 313 and 314 into openings in the fifth, sixth, seventh and eighth sidewalls 322, 323, 324 and 325.

The light source 210, the reflecting plate 240, the light guide plate 220 and the first optical sheets 230 are sequentially received into the receiving space defined by the base 321 and the fifth, sixth, seventh and eighth sidewalls 322, 323, 324 and 325.

Referring to FIGS. 2 and 6, the first flexible printed circuit film 140 has a first end attached to an end of the main liquid crystal display panel 110 and a second end attached to the printed circuit board 120. The printed circuit board 120 is disposed on a rear face of the bottom chassis 320 by bending the first flexible printed circuit film 140.

The sub display module 600 includes a sub liquid crystal display panel 610, a sub mold 630, a second optical sheet 635 and a second flexible printed circuit film 620. The sub liquid crystal display panel 610 includes a sub TFT substrate 611, a sub color filter substrate 612 and a sub liquid crystal layer (not shown). The sub color filter substrate 612 is combined with the sub TFT substrate 611, and the sub liquid crystal layer is disposed between the sub TFT substrate 611 and the sub color filter substrate 612.

The sub mold 630 includes a light guide portion 631 and a side portion 632. The light guide portion 631 receives the light from a sub light source 650 and provides the light to the sub liquid crystal display panel 610. The sub mold 630 has a sub receiving recess 630a to receive the sub light source 650. The sub receiving recess 630a is formed at a position adjacent to the light guide portion 631. In the present embodiment, the sub light source 650 is fixed onto a first face 120b of the printed circuit board 120.

The side portion 632 extends from the light guide portion 631. Thus, a sub receiving space defined by the side portion 632 is provided on the light guide portion 631. The second optical sheet 635 is received into the sub receiving space. In the present embodiment, the sub mold 630 is made of a transparent material such as polycarbonate (PC).

The sub liquid crystal display panel 610 is disposed on the second optical sheet 635. The sub liquid crystal display panel 610 receives the light having improved brightness and visual angle through the second optical sheet 635 to display an image.

The printed circuit board 120 has a second face 120a facing the rear face of the bottom chassis 320, and the sub display module 600 is disposed on the first face 120b of the printed circuit board 120. The sub mold 630 is combined with the bottom chassis 320 to fix the sub display module 600 onto the first face 120b of the printed circuit board 120.

The sub mold 630 further includes a first fixing protrusion 633 and a second fixing protrusion 634 respectively formed at predetermined portions of the side portion 632. The seventh and eighth sidewalls 324 and 325 of the bottom chassis 320 have a first fixing opening 324a and a second fixing opening 325a, respectively. Thus, the sub display module 600 may be fixed onto the first face 120b of the printed circuit board 120 by inserting the first and second fixing protrusions 633 and 634 into the first and second fixing openings 324a and 325a, respectively.

In order to prevent separation of the main liquid crystal display panel 110 from the backlight assembly 400, the main display module 500 further includes a main top chassis 510 coupled to the bottom chassis 320. Also, the sub display module 600 further includes a sub top chassis 640 coupled to the sub mold 630 so as to prevent separation of the sub liquid crystal display panel 610 from the sub mold 630.

In the present embodiment, the main liquid crystal display panel 110 has a larger size than the sub liquid crystal display panel 610 as shown in FIG. 6. However, the main liquid crystal display panel 110 may have a same size as the sub liquid crystal display panel 610.

Figure 8:
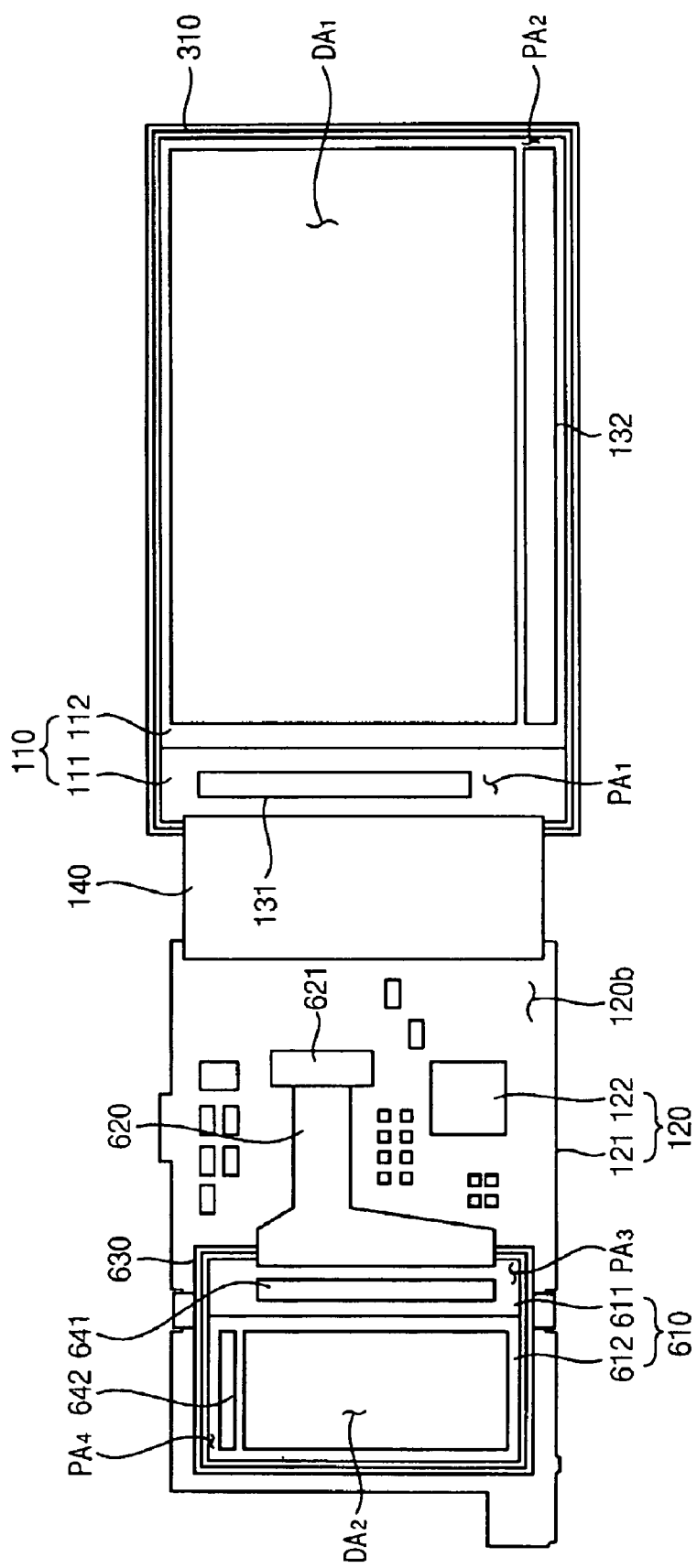
FIG. 8 is a plan view of the dual panel type liquid crystal display apparatus in FIG. 7.
Figure 9:
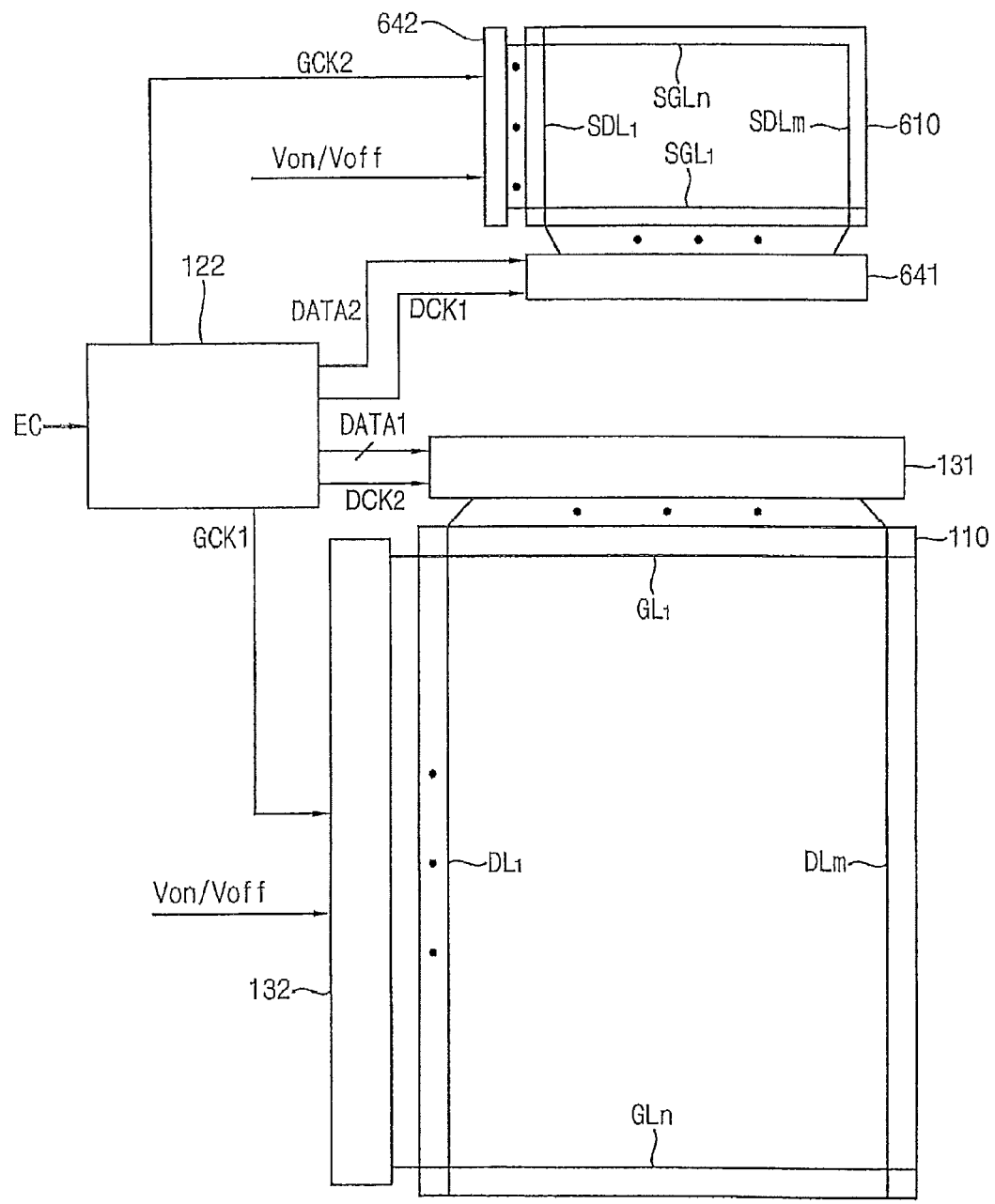
FIG. 9 is a block diagram of the dual panel type liquid crystal display apparatus in FIG. 8.

FIG. 8 is a plan view of the dual panel type liquid crystal display apparatus in FIG. 7. FIG. 9 is a block diagram of the dual panel type liquid crystal display apparatus in FIG. 8.

Referring to FIGS. 8 and 9, the main liquid crystal display panel 110 includes the TFT substrate 111 and the color filter substrate 112. The TFT substrate 111 includes the gate lines GL1~GLn and the data lines DL1~DLm formed in the first display area DA1. A chip in which the data driving circuit 131 is formed is mounted on a first peripheral area PA1 in which ends of the data lines DL1~DLm are formed. The gate driving circuit 132 is formed in a second peripheral area PA2 by the thin film process, in which ends of the gate lines GL1~GLn are formed.

The sub liquid crystal display panel 610 includes the sub TFT substrate 611 and the sub color filter substrate 612. The sub TFT substrate 611 includes the sub gate lines SGL1~SGLn and the sub data lines SDL1~SDLm formed in the second display area DA2. A chip in which a sub data driving circuit 641 is formed is mounted on a third peripheral area PA3 in which ends of the sub data lines SDL1~SDLm are formed. The sub gate driving circuit 642 is formed in a fourth peripheral area PA4 by the thin film process, in which the ends of the sub gate lines SGL1~SGLn are formed.

The flip chip 122 and the sub display module 600 are disposed on the first face 120b of the printed circuit board 120. The flip chip 122 is fixed onto the first face 120b as shown in FIGS. 3 to 5. When the flip chip 122 is fixed onto the first face 120b as described above, the printed circuit board 120 has a space on which the sub display module 600 can be mounted.

A first connector 621 is formed on the printed circuit board 120, and the second flexible film 620 is disposed between the first connector 621 and the sub liquid crystal display panel 610. A first end of the second flexible printed circuit film 620 is connected to the first connector 621 and a second end of the second flexible printed circuit film 620 is attached to the sub liquid crystal display panel 610. Thus, the printed circuit board 120 may be electrically connected to the sub liquid crystal display panel 610 with the second flexible printed circuit film 620.

In the present embodiment, the flip chip 122 has a graphic control chip to output first and second image signals DATA1 and DATA2, first and second gate control signals GCK1 and GCK2, and first and second data control signals DCK1 and DCK2 in response to an external control signal EC.

The first image signal DATA1 and the first data control signal DCK1 output from the flip chip 122 are applied to the data driving circuit 131 through the first flexible printed circuit film 140. The data driving circuit 131 applies the first data signal to the data lines DL1~DLm in response to the first image signal DATA1 and the first data control signal DCK1. The on/off voltage Von/Voff and the first gate control signal GCK1 from the flip chip 122 are applied to the gate driving circuit 132 through the first flexible printed circuit film 140. Responsive to the on/off voltage Von/Voff and the first gate control signal GCK1, the gate driving circuit 132 sequentially applies the first gate signal to the gate lines GL1~GLn. Thus, the main liquid crystal display panel 110 displays the image in response to the first data signal and the second gate signal.

The second image signal DATA2 and the second data control signal DCK2 from the flip chip 122 are applied to the sub data driving circuit 641 through the second flexible printed circuit film 620. The sub data driving circuit 641 applies a second data signal to the sub data lines SDL1~SDLm in response to the second image signal DATA2 and the second data control signal DCK2. The on/off voltage Von/Voff and the second gate control signal DCK2 from the flip chip 122 are applied to the sub gate driving circuit 642 through the second flexible printed circuit film 620. Responsive to the on/off voltage Von/Voff and the second gate control signal GCK2, the sub gate driving circuit 642 sequentially applies a second gate signal to the sub gate lines SGL1~SGLn. Thus, the sub liquid crystal display panel 610 displays the image in response to the second data signal and the second gate signal.

Figure 10:
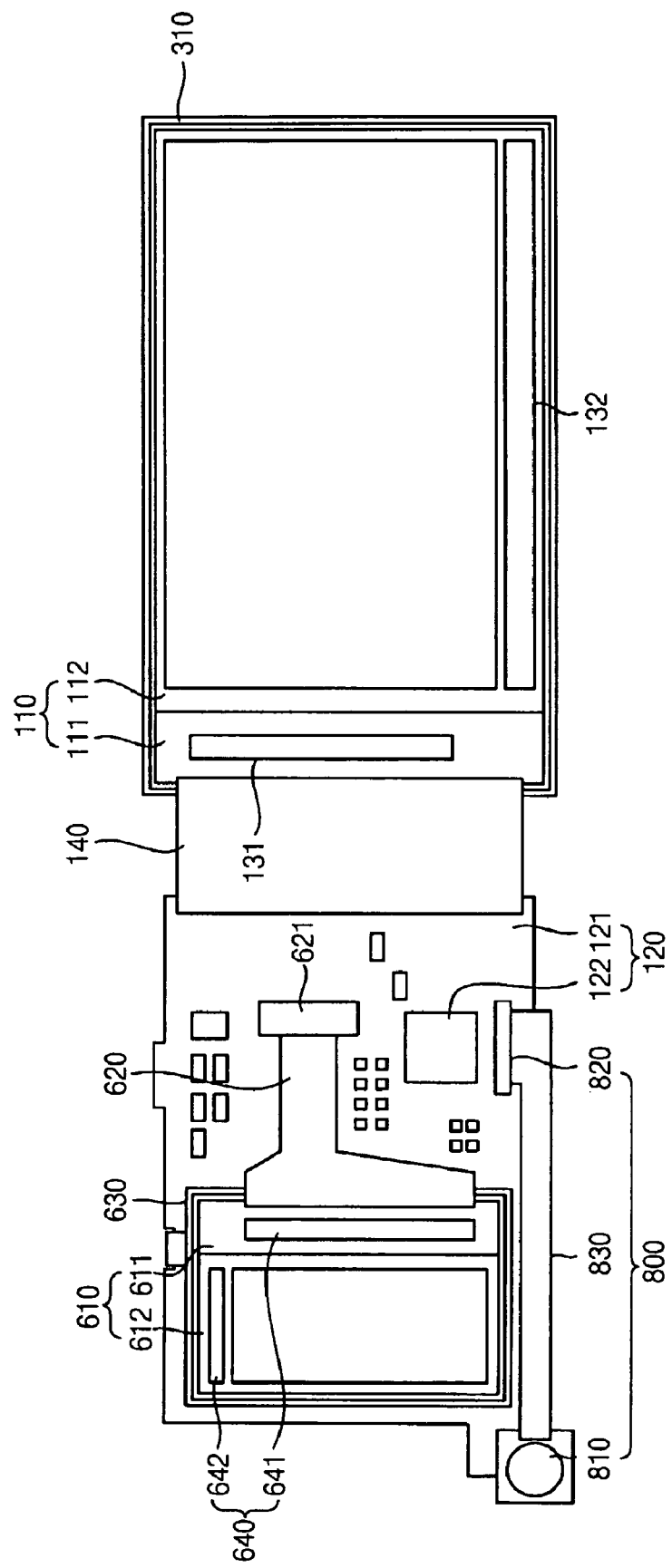
FIG. 10 is a plan view showing a dual panel type liquid crystal display apparatus according to another exemplary embodiment of the present invention.

FIG. 10 is a plan view showing a dual panel type liquid crystal display apparatus according to another exemplary embodiment of the present invention. In FIG. 10, the same reference numerals denote the same elements in FIG. 8, and thus any further detailed descriptions of the same elements will be omitted.

Referring to FIG. 10, a dual panel type liquid crystal display apparatus according to another exemplary embodiment of the present invention further includes a camera module 800. The camera module 800 has a camera 810, a second connector 820 and a third flexible printed circuit board 830.

The flip chip 122 on the first face 120b of the printed circuit board 120 outputs a camera control signal to drive the camera 810. The second connector 820 is formed on the first face 120b to receive the camera control signal from the flip chip 122. The third flexible printed circuit film 830 has a first end coupled to the second connector 820 and a second end attached to the camera 810. Thus, the third flexible printed circuit film 830 provides the camera 810 with the camera control signal.

In the present embodiment, the flip chip 122, the sub display module 600 (refer to FIG. 6) and camera module 800 are mounted on the first face 120b of the printed circuit board 120. The flip chip 122 is fixed onto the first face 120b through processes shown in FIGS. 3 to 5. When the flip chip 122 is fixed onto the first face 120b, the printed circuit board 120 may obtain a space sufficient for the sub display module 600 and the camera module 800 to be mounted thereon.

According to the display apparatus, the flip chip has bumps and the base substrate has input pads corresponding to the bumps. The bumps and input pads are electrically connected to each other by the adhesive member, so that less space is needed to accommodate the chip mounted on the printed circuit board.

When the flip chip and the second display panel are mounted on the same surface, the decreased chip size frees up space on the printed circuit board. This freed up space allows the second display panel to be mounted on the printed circuit board.

Although exemplary embodiments of the present invention have been described, it is understood that the present invention should not be limited to these exemplary embodiments but various changes and modifications can be made by one of ordinary skilled in the art within the spirit and scope of the present invention as hereinafter claimed.

What is claimed is:

1. A display apparatus comprising:

a printed circuit board to output a control signal, the printed circuit board having a base substrate, a flip chip on the base substrate and an adhesive member between the base substrate and the flip chip; wherein the flip chip comprises a plurality of first output pads to output the control signal, the first output pads being arranged along an edge of the flip chip and spaced apart from each other by a first interval distance, and a plurality of second output pads formed farther away from the edge of the flip chip than the first output pads and spaced apart from each other by a second interval distance greater than the first interval distance, wherein the first and second output pads are formed on the same layer along a rear face of the flip chip toward the base substrate;

a driving circuit to output a driving signal in response to the control signal; and a display panel to display an image in response to the driving signal, the display panel spaced apart from the flip chip, wherein the flip chip further comprises:

a plurality of connecting lines to electrically connect the first output pads and the second output pads;

a plurality of bumps disposed on the second output pads, the bumps sized smaller than the second output pads and protruding from the second output pads by a predetermined height so that the bumps of the flip chip are connected to the base substrate without soldering; and a plurality of test bumps disposed on the first output pad for testing the flip chip, the test bumps sized smaller than the first output pads.

2. The display apparatus of claim 1, wherein the bumps comprise gold.

3. The display apparatus of claim 1, wherein the flip chip further comprises an insulating layer to cover the first output pads, the second output pads and the connecting lines, and wherein a plurality of contact holes are formed through the insulating layer to expose the bumps.

4. The display apparatus of claim 1, wherein the base substrate comprises a plurality of input pads in a region on which the flip chip is mounted, and the input pads are electrically connected to the bumps by the adhesive member so as to receive the control signal.

5. The display apparatus of claim 4, further comprising an anisotropic conductive film having a thermosetting resin and a plurality of conductive particles in the thermosetting resin, wherein the thermosetting resin attaches the flip chip onto the base substrate and the conductive particles electrically connect the flip chip and the base substrate.

6. The display apparatus of claim 4, wherein the adhesive member comprises:

a metal layer; and an epoxy resin that is curable by heat.

7. The display apparatus of claim 6, wherein the metal layer comprises tin, and the tin is plated on upper faces of input pads or upper faces of the bumps to form the metal layer.

8. The display apparatus of claim 1, wherein the flip chip is a graphic control chip.

* * * * *